(12) United States Patent
Harvill et al.

(10) Patent No.: US 10,719,862 B2
(45) Date of Patent: Jul. 21, 2020

(54) SYSTEM AND METHOD FOR INTAKE OF MANUFACTURING PATTERNS AND APPLYING THEM TO THE AUTOMATED PRODUCTION OF INTERACTIVE, CUSTOMIZABLE PRODUCT

(75) Inventors: Young Harvill, Half Moon Bay, CA (US); Robert I. Beaver, III, San Francisco, CA (US)

(73) Assignee: ZAZZLE INC., Redwood City, CA (US)

( * ) Notice: Subject to any disclaimer, the term of this patent is extended or adjusted under 35 U.S.C. 154(b) by 772 days.

(21) Appl. No.: 13/598,544

(22) Filed: Aug. 29, 2012

(65) Prior Publication Data
US 2013/0060654 A1 Mar. 7, 2013

Related U.S. Application Data

(63) Continuation-in-part of application No. 12/511,910, filed on Jul. 29, 2009, now Pat. No. 8,175,931.

(60) Provisional application No. 61/084,576, filed on Jul. 29, 2008, provisional application No. 61/529,234, filed on Aug. 30, 2011.

(51) Int. Cl.
G06Q 30/00 (2012.01)
G06Q 30/06 (2012.01)
G06Q 50/04 (2012.01)

(52) U.S. Cl.
CPC ......... *G06Q 30/0621* (2013.01); *G06Q 30/06* (2013.01); *G06Q 30/0601* (2013.01); *G06Q 50/04* (2013.01); *Y02P 90/30* (2015.11)

(58) Field of Classification Search
CPC ......... G06Q 30/06–0645; G06Q 30/08; G06Q 30/0621; G06Q 30/0633; G06Q 30/0643; G06Q 30/0601–0645
USPC .................................................. 705/26.1–27.2
See application file for complete search history.

(56) References Cited

U.S. PATENT DOCUMENTS

| | | | |
|---|---|---|---|
| 4,636,027 A | 1/1987 | Dube | |
| 4,888,260 A | 12/1989 | Cowan | |
| 5,134,669 A | 7/1992 | Keogh et al. | |
| 5,343,401 A | 8/1994 | Goldberg et al. | |
| 5,422,819 A | 6/1995 | Nakamura | |
| 5,615,318 A | 3/1997 | Matsuura | |
| 5,850,222 A | 12/1998 | Cone | |
| 5,872,555 A | 2/1999 | Kolar et al. | |
| 6,012,402 A | 1/2000 | Sekine | |

(Continued)

FOREIGN PATENT DOCUMENTS

| | | |
|---|---|---|
| CN | 1536511 A | 10/2004 |
| CN | 1713196 A | 12/2005 |

(Continued)

OTHER PUBLICATIONS

PCT/US2012/053081 International Preliminary Report on Patentability dated Mar. 13, 2014 (5 pages).

(Continued)

*Primary Examiner* — Jeffrey A. Smith
*Assistant Examiner* — Allison G Wood
(74) *Attorney, Agent, or Firm* — DLA Piper LLP (US)

(57) ABSTRACT

A system and method for acquisition, characterization, and application of Manufacturing patterns to the automated production of the digital representation of these patterns as interactive media that gathers a customer's input, and subsequently produces physical product is described.

8 Claims, 12 Drawing Sheets

(56) References Cited

U.S. PATENT DOCUMENTS

| | | | |
|---|---|---|---|
| 6,012,890 A | 1/2000 | Celorio Garrido | |
| 6,029,141 A | 2/2000 | Bezos et al. | |
| 6,097,310 A | 8/2000 | Harrell et al. | |
| 6,173,211 B1 | 1/2001 | Williams et al. | |
| 6,321,670 B1 | 1/2001 | Tomita et al. | |
| 6,196,146 B1 | 3/2001 | Goldberg et al. | |
| 6,280,891 B2 | 8/2001 | Daniel | |
| 6,310,627 B1 | 10/2001 | Sakaguchi | |
| 6,392,748 B1 | 5/2002 | Fately | |
| 6,473,671 B1 | 10/2002 | Yan | |
| 6,513,921 B1 | 2/2003 | Houle | |
| 6,513,924 B1 | 2/2003 | Goldberg et al. | |
| 6,546,309 B1 | 4/2003 | Gazzuolo | |
| 6,564,118 B1 | 5/2003 | Swab | |
| 6,804,573 B2 | 10/2004 | Goldman | |
| 6,804,660 B2 | 10/2004 | Landau et al. | |
| 6,842,532 B2 | 1/2005 | Hu et al. | |
| 6,859,679 B1 | 2/2005 | Smith | |
| 6,907,310 B2 | 6/2005 | Gardner et al. | |
| 6,947,808 B2 | 9/2005 | Goldman | |
| 6,968,075 B1 | 11/2005 | Chang | |
| 6,994,201 B2 | 2/2006 | Yu et al. | |
| 7,016,756 B2 | 3/2006 | Goldman | |
| 7,016,757 B2 | 3/2006 | Goldman | |
| 7,054,709 B2 | 5/2006 | Takeuchi | |
| 7,216,092 B1 | 5/2007 | Weber et al. | |
| 7,340,416 B1 * | 3/2008 | Larabee | G06Q 10/0631 |
| | | | 705/26.35 |
| 7,409,259 B2 | 8/2008 | Reyes Moreno | |
| 7,479,956 B2 | 1/2009 | Shaw-Weeks | |
| 7,616,851 B1 | 11/2009 | Uhlhorn et al. | |
| 8,069,091 B1 | 11/2011 | Callen et al. | |
| 8,090,461 B2 | 1/2012 | Harvill et al. | |
| 8,174,521 B2 | 5/2012 | Harvill et al. | |
| 8,175,931 B2 | 5/2012 | Harvill et al. | |
| 8,240,262 B2 | 8/2012 | Zeiger et al. | |
| 8,249,738 B2 | 8/2012 | Lastra et al. | |
| 8,401,916 B2 | 3/2013 | Harvill et al. | |
| 8,411,090 B2 | 4/2013 | Wang | |
| 8,514,220 B2 | 8/2013 | Harvill et al. | |
| 8,516,392 B2 | 8/2013 | Ostroff | |
| 8,654,120 B2 | 2/2014 | Beaver et al. | |
| 8,711,175 B2 | 4/2014 | Aarabi | |
| 8,712,566 B1 | 4/2014 | Harvill | |
| 8,878,850 B2 | 11/2014 | Harvill et al. | |
| 8,958,633 B2 | 2/2015 | Harvill | |
| 9,087,355 B2 | 7/2015 | Harvill et al. | |
| 9,213,920 B2 | 12/2015 | Harvill et al. | |
| 9,477,979 B2 | 10/2016 | Harvill et al. | |
| 2001/0026272 A1 | 10/2001 | Feid et al. | |
| 2002/0007228 A1 | 1/2002 | Goldman | |
| 2002/0030689 A1 | 3/2002 | Eichel et al. | |
| 2002/0082960 A1 | 6/2002 | Goedken | |
| 2002/0099524 A1 | 7/2002 | Sell et al. | |
| 2003/0023687 A1 | 1/2003 | Wolfe | |
| 2003/0076318 A1 | 4/2003 | Shaw-Weeks | |
| 2003/0120183 A1 | 6/2003 | Simmons | |
| 2003/0168148 A1 | 9/2003 | Gerber et al. | |
| 2003/0177364 A1 | 9/2003 | Walsh et al. | |
| 2003/0179197 A1 | 9/2003 | Sloan et al. | |
| 2003/0182402 A1 | 9/2003 | Goodman et al. | |
| 2003/0184544 A1 | 10/2003 | Prudent | |
| 2003/0229893 A1 | 12/2003 | Sgaraglino | |
| 2004/0024764 A1 | 2/2004 | Hsu et al. | |
| 2004/0044566 A1 | 3/2004 | Bostelmann et al. | |
| 2004/0049309 A1 | 3/2004 | Gardner et al. | |
| 2004/0078285 A1 | 4/2004 | Bijvoet | |
| 2004/0078294 A1 | 4/2004 | Rollins et al. | |
| 2004/0095375 A1 | 5/2004 | Burmester et al. | |
| 2004/0153512 A1 | 8/2004 | Friend | |
| 2004/0194344 A1 | 10/2004 | Tadin | |
| 2004/0227752 A1 | 11/2004 | McCartha et al. | |
| 2004/0236455 A1 | 11/2004 | Woltman et al. | |
| 2004/0236634 A1 | 11/2004 | Ruuttu | |
| 2004/0267610 A1 | 12/2004 | Gossett et al. | |
| 2005/0065799 A1 | 3/2005 | Dare et al. | |
| 2005/0071242 A1 | 3/2005 | Allen et al. | |
| 2005/0125092 A1 * | 6/2005 | Lukis et al. | 700/197 |
| 2005/0131571 A1 | 6/2005 | Costin | |
| 2005/0144090 A1 * | 6/2005 | Gadamsetty | G06Q 30/0603 |
| | | | 705/26.1 |
| 2005/0149223 A1 | 7/2005 | Takeuchi | |
| 2005/0155316 A1 | 7/2005 | Shipley | |
| 2005/0177453 A1 | 8/2005 | Anton et al. | |
| 2005/0182707 A1 | 8/2005 | Yeager | |
| 2005/0203766 A1 | 9/2005 | Donaldson | |
| 2005/0204002 A1 | 9/2005 | Friend | |
| 2005/0238251 A1 | 10/2005 | Lunetta et al. | |
| 2005/0251462 A1 * | 11/2005 | Nykamp | G06Q 10/10 |
| | | | 705/26.41 |
| 2006/0015207 A1 | 1/2006 | Weiser et al. | |
| 2006/0020486 A1 | 1/2006 | Kurzweil et al. | |
| 2006/0027154 A1 | 2/2006 | Naka et al. | |
| 2006/0156283 A1 | 7/2006 | Landau et al. | |
| 2006/0178952 A1 | 8/2006 | Harris | |
| 2006/0226563 A1 | 10/2006 | Albert et al. | |
| 2007/0005461 A1 | 1/2007 | Lenz | |
| 2007/0083383 A1 | 4/2007 | Van Bael et al. | |
| 2007/0174132 A1 | 7/2007 | Shemula | |
| 2007/0208633 A1 | 9/2007 | Singh | |
| 2008/0006192 A1 | 1/2008 | Zeiger et al. | |
| 2008/0079727 A1 | 4/2008 | Goldman et al. | |
| 2008/0092309 A1 | 4/2008 | Ellis et al. | |
| 2008/0147512 A1 * | 6/2008 | Yankton | G06Q 10/08 |
| | | | 705/26.5 |
| 2008/0147219 A1 | 8/2008 | Jones | |
| 2009/0070666 A1 | 3/2009 | Eilers et al. | |
| 2009/0109214 A1 | 4/2009 | Harvill et al. | |
| 2009/0122329 A1 | 5/2009 | Hegemier et al. | |
| 2009/0182573 A1 | 7/2009 | Lidestri | |
| 2009/0190858 A1 | 7/2009 | Moody et al. | |
| 2009/0222127 A1 | 9/2009 | Lind | |
| 2009/0254207 A1 | 10/2009 | Tiffany et al. | |
| 2010/0042484 A1 * | 2/2010 | Sipes | G06Q 30/0241 |
| | | | 705/14.4 |
| 2010/0119957 A1 | 5/2010 | Satou et al. | |
| 2010/0169185 A1 | 7/2010 | Cottingham | |
| 2010/0185309 A1 | 7/2010 | Ohiaeri et al. | |

FOREIGN PATENT DOCUMENTS

| | | |
|---|---|---|
| CN | 1828671 | 9/2006 |
| CN | 1877629 | 12/2006 |
| CN | 101663662 A | 3/2010 |
| EP | 1136899 | 9/2001 |
| JP | S61-255376 | 11/1986 |
| JP | 10-222653 A | 8/1998 |
| JP | 10-247256 A | 9/1998 |
| JP | 11-066119 A | 3/1999 |
| JP | 2001-052177 | 2/2001 |
| JP | 2001-314677 | 11/2001 |
| JP | 2002-133201 | 5/2002 |
| JP | 2003-122960 A | 4/2003 |
| JP | 2004-152000 A | 5/2004 |
| JP | 2005-118215 | 5/2005 |
| JP | 2007-183486 | 7/2007 |
| JP | 2011-077764 | 4/2011 |
| KR | H02-104758 | 4/1990 |
| KR | H07-140886 | 6/1995 |
| WO | WO 2001/087001 | 11/2001 |
| WO | WO 2002/012925 | 2/2002 |
| WO | WO 2003/085186 | 10/2003 |
| WO | WO 2008/038039 | 4/2008 |
| WO | WO 2010/022404 | 2/2010 |
| WO | WO 2012/067230 | 5/2012 |

OTHER PUBLICATIONS

PCT/US2012/053081 International Search Report dated Nov. 2, 2012 (2 pages).
PCT/US2012/053081 Written Opinion dated Nov. 2, 2012 (3 pages).
Extended European Search Report of EP 12827501.3; dated Jan. 21, 2015 (6 pgs.).

(56) References Cited

OTHER PUBLICATIONS

Japanese Notification of Reason for Rejection of JP 2014-528591 (in English and Japanese); dated Feb. 16, 2015 (3 pgs.).
Australian Patent Examination Report No. 1 of AU 2012301864; dated Feb. 27, 2015 (3 pgs.).
Demarco "Zazzle and Pitney Bowes Team up to deliver custom stamps to consumers," (2005), published online: http//www.zazzle.com/mk/welcome/pressreleases/pr071805_2 (2 pages).
Ehara J et al: "Texture overlay for virtual clothing based on PCA of silhouettes" Mixed and Augmented Reality, 2006. ISMAR 2006. IEEE/ACM International Symposium on, IEEE, PI, Oct. 1, 2006 (Oct. 1, 2006), pp. 139-142, XP031014661 ISBN: 9784-4244-0650-0 (4 pages).
Ehara J et al: "Texture overlay onto deformable surface for virtual clothing" ACM International Conference Proceeding Series—Proceedings of the 2005 International Conference on Augmented Tele-Existence, ICAT '05 2005 Association for Computing Machinery USA, vol. 157, 2005 , pp. 172-179, XP002606672 DO!: DOI:10.1145/1152399.1152431 (8 pages).
Gruber, "Texture Mapping," Ted Gruber Software, Inc., pp. 1-2 (2001) (2 pgs.).
Heckbert, Paul S. "Fundamentals of texture mapping and image warping" Master's Thesis under the direction of Carlo Sequin, Dept. of Electrical Engineering and Computer Science University of California, Berkeley. Jun. 17, 1989.
Meseth "Towards Predictive Rendering in Virtual Reality" Ph.D. dissertation, Bonn University, published Oct. 2006 (369 pages).
Nelson, J "From Moon Shoes to Gel Gun—Sustaining Hart health", Columbian. Vancouver, Wash.: Oct. 11, 2007 (3 pages).
Real Studio, "Real 3D Tutorials: Tutorial 5—Texture Mapping," pp. 1-5 (printed Sep. 9, 2016) (5 pgs.).
Scholz V et al: "Garment motion capture using color-coded patterns" Computer Graphics Forum Blackwell Publishers for Eurographics Assoc UK, vol. 24, No. 3, 2005 , pp. 439-439, XP002603022 ISSN: 0167-7055 (9 pages).
Wolfe, "Teaching Texture Mapping Visually," Nov. 1997, pp. 1-37 (37 pgs.).
Wu et al., Wavelength-multiplexed submicron holograms for disk-compatible data storage, Optics Express, vol. 15, No. 26, Dec. 24, 2007, pp. 17798-17804 (7 pgs.).

\* cited by examiner

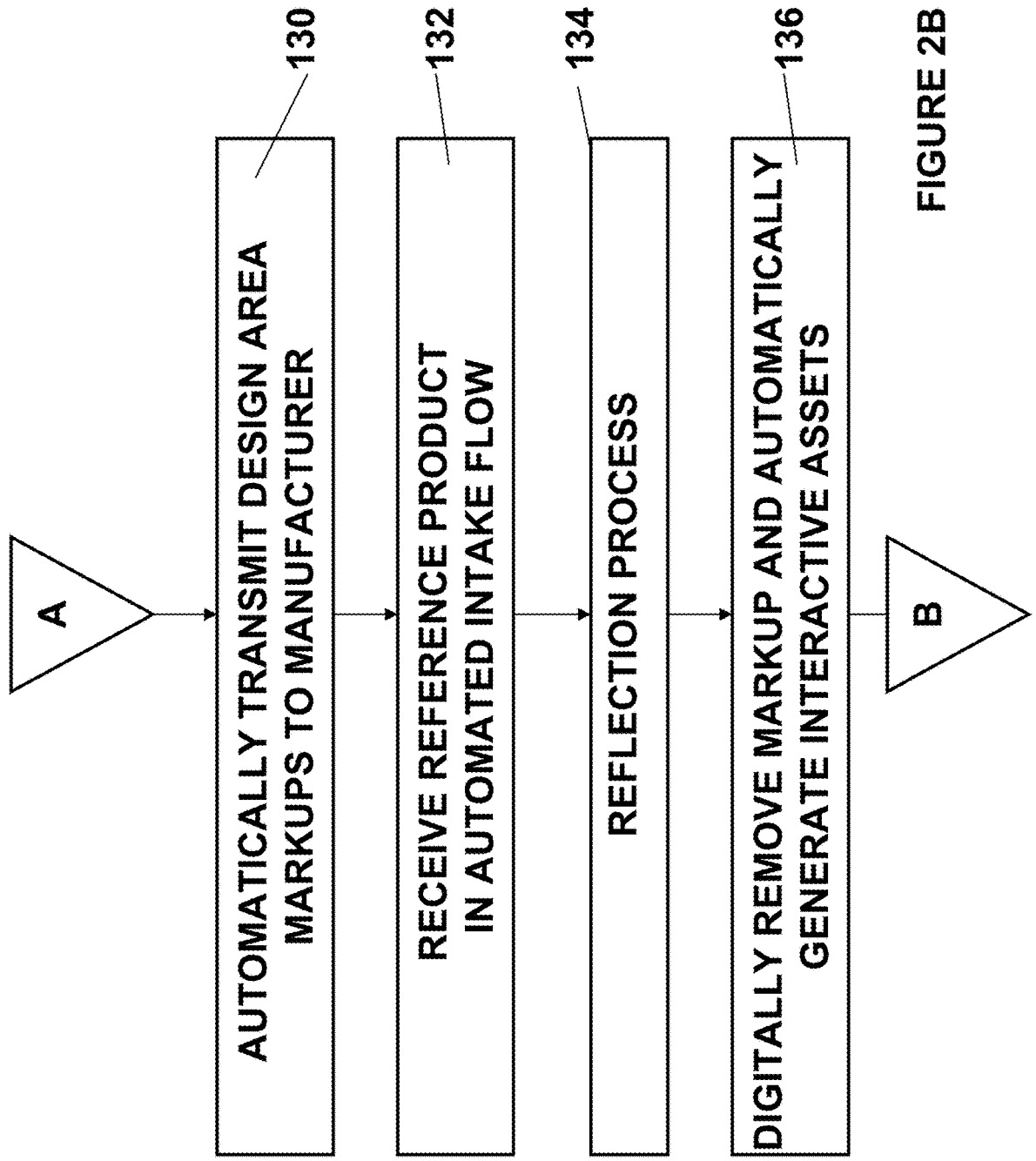

SYSTEM AND METHOD FOR INTAKE OF MANUFACTURING PATTERNS AND APPLYING THEM TO THE AUTOMATED PRODUCTION OF INTERACTIVE, CUSTOMIZABLE PRODUCT

PRIORITY CLAIMS/RELATED APPLICATIONS

This application claims the benefit under 35 USC 119(e) to U.S. Provisional Patent Application Ser. No. 61/529,234 filed on Aug. 30, 2011 and entitled "System And Method For Intake Of Manufacturing Patterns And Applying Them To The Automated Production Of Interactive, Customizable Product", the entirety of which is incorporated herein by reference. This application also claims priority under 35 USC 120 and is a continuation in part of U.S. patent application Ser. No. 12/511,910 filed on Jul. 29, 2009 which in turn claims the benefit under 35 USC 119(e) and priority under 35 USC 120 to U.S. Provisional Patent Application Ser. No. 61/084,576, filed on Jul. 29, 2008 and entitled "Product Customization System and Method", the entirety of all of which are incorporated herein by reference.

APPENDICES

Appendix A (2 pages) contains pseudocode for a mesh detection method that is part of the product customization unit. Appendix A is incorporated herein by reference and forms part of this specification.

Appendix B is an XML file (10 pages) for a compound product; and

Appendix C is an XML file (8 pages) for a simple product.

FIELD

The system relates to a product customizing system and method.

BACKGROUND

A wide variety of customizable, manufactured products may be partially described as vector patterns which map areas of printing, decoration, embellishment, or material selection to the physical manufactured product, these customizable areas may be called Design Areas. A complete description of the mapping of design areas to product is often impractical or difficult to obtain from manufacturers. A product may be a flexible assembly of separate cut and printed pieces, with relatively wide tolerances that make complete geometric description of this mapping difficult for the manufacturer. Part of the product customization may require portions of the product to change in size, making the mapping of the design to product more difficult for the manufacturer. A product may be an assembly of parts with some known mappings of Design Areas to product surfaces, but the manufacturer may not have a description of the relationship of the parts based on the function of the product.

Thus, a system and method are provided for acquisition, characterization, and application of Manufacturing patterns to the automated production of the digital representation of these patterns as interactive media that gathers a customer's input, and subsequent production of physical products.

BRIEF DESCRIPTION OF THE DRAWINGS

FIGS. 2A-2C illustrate a process for acquisition, characterization, and application of Manufacturing patterns to the automated production of the digital representation of these patterns as interactive media that gathers a customer's input, and subsequent production of physical products;

DETAILED DESCRIPTION OF ONE OR MORE EMBODIMENTS

The system and method are particularly applicable to web-based client/server architecture system for a shoe customization system and method implemented in software on a computer as described below and it is in this context that the system and method will be described. It will be appreciated, however, that the system and method can be used to customize any product in which it would be desirable to allow a consumer/user to insert user content onto a product that can be manufactured by the system. In addition, the system and method can be implemented in software (shown in the illustrated implementation), hardware or a combination of hardware and software and may also be implemented on client/server system (shown in the illustrated implementation), a web server, a terminal, a peer to peer system and the like so that the system and method are not limited to the particular implementation of the system or method.

Figure 1A:
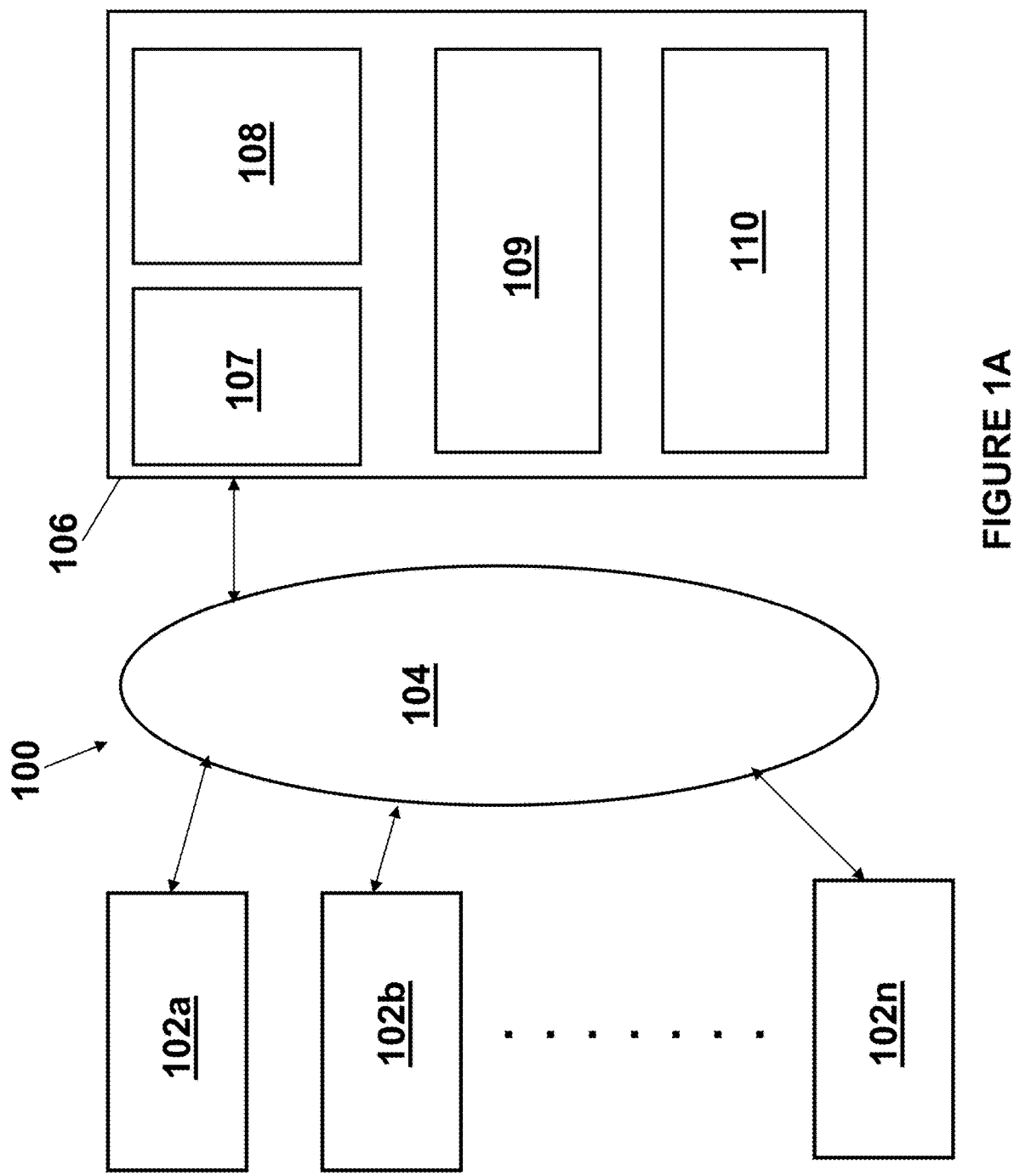
FIG. 1A illustrates an example of an embodiment of a product customization system.

FIG. 1A illustrates an example of an implementation of a product customization system 100. The system may include one or more consumer computing devices 102, (such as 102a, 102b, . . . , 102n) wherein each computing device has at least one processing unit, memory, some persistent memory, some other memory, a display device and input/output devices (and each may be a personal computer, mobile device, cellular device, wireless email device, converged device such as a Treo or Blackberry and the like) that permit the consumer to interact with the consumer computing device as well as the system through an application, such as for example a known browser application, being executed by the consumer computing device. Each consumer computing device may establish a connection with and communicate over a link 104 using a typical secure or unsecure protocol with a product customization unit 106. The link 104 may be implemented using a computer network, a cellular network, a wired or wireless link and the like. In one embodiment, the link is the Internet. The product customization unit 106 may be implemented in hardware, software or a combination of hardware and software. In one embodiment, the product customization unit 106 may be one or more server computers that execute a plurality of lines of computer code to perform the functions and operations of the product customization unit 106 as described below.

In one illustrative embodiment, the product customization unit 106 may further comprise at least one web server 107 (implemented in hardware or software or a combination of the two) that establishes a connection with each consumer computer device, receives requests from each consumer computer device and communicates data and information (such as by using one or more web pages) and requests for consumer computer device information to each consumer computer device wherein the consumer computer device interacts with the web server using a known secure or unsecure protocol and a typical browser application. At least one web server, for example, may serve a web page that allows the consumer to browse the available products and designs and then, using the product customization system, customize the particular design of a particular product using user content. The product customization unit may further include a store 108 that contains and stores the relevant information for the product customization unit including the product information and images for the web pages, customization data, etc. The product customization unit may further comprise a product customizer 109 (that may be implemented as a plurality of lines of computer code wherein the plurality of lines of computer code are executed by the processing unit(s) of the server computers to implement the product customization system) that allows a consumer to customize a product, allows a consumer to upload user content (images and/or text), and allows the consumer to place the user content on the product, allows the consumer to view the customized product for all angles, and allows the consumer to customize various features of the product, etc. as described below in more detail. The product customization unit may further comprise a well known ecommerce engine 110 that, once the consumer has customized a product with particular user content, may allow the consumer to purchase the customized product. In one implementation, the product customization system may also be part of a larger web site/system such as, for example, www.zazzle.com.

For purposes of illustrating the product customization system and method, a product customization method and user interface for a simple product (such as the blackberry case as described below and illustrated in FIGS. 3A-3F), a geometric product (such as the picture frame), a complex product (such as a shoe), and a compound product, which as multiple components of any of these upon which user content is placed is described below. However, the product customization system may also be used for other products, such as other apparel and other products in which it is desirable to provide a consumer with the ability to customize the product with user content.

Figure 1B:
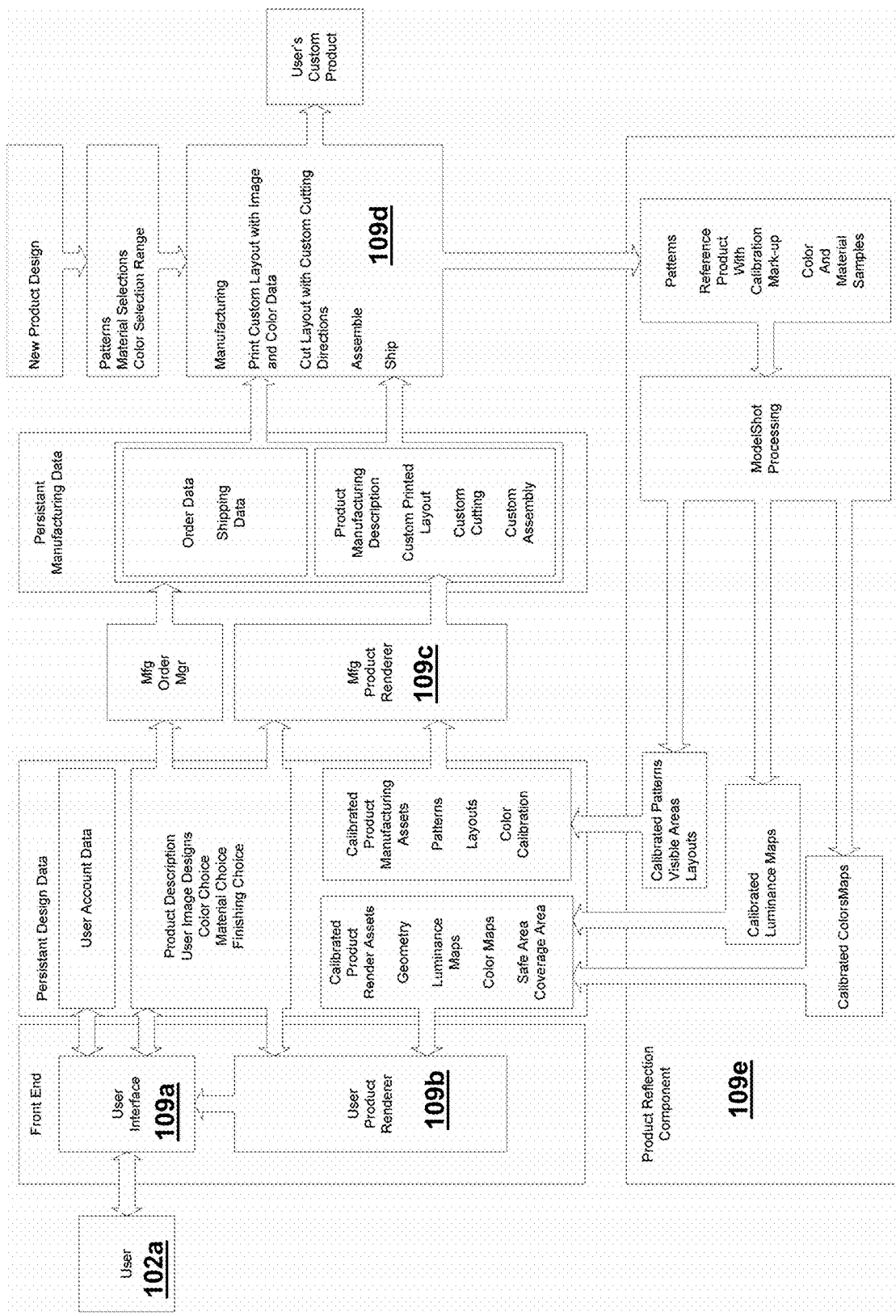
FIG. 1B illustrates more details of the product customization unit that is part of the product customization system.

FIG. 1B illustrates more details of the product customization unit 109 that is part of the product customization system. In particular, the product customization unit may further comprises a user interface portion 109a, a user product renderer portion 109b, a manufacturing product renderer portion 109c, a manufacturing portion 109d and a reflection portion 109e. In one implementation, each of these portions may be implemented using a combination of hardware and software. Each of these portions of the product customization unit 109 are described in further detail with reference to FIG. 1C. FIG. 1B also illustrates the various data that is associated with the product customization unit that may be stored in a store that may be, in one embodiment, a software based database. The data includes persistent design data, persistent manufacturing data and the like as shown.

FIG. 1C illustrates an implementation of a method 120 for product customization that may be implemented, for example, by the product customization system shown in FIG. 1A. The method allows the manufacture of user designed products and the method applies user created colors and designs to a product made out of flat pattern pieces of fabric and sewn together in one embodiment.

The product customization system permits a user/consumer to customize a product using the user interface portion 109a (122) that may be implemented as one more web pages in one embodiment. The user interface portion 109a allows the user to interactively apply colors, tiled images, and photographic or designed images (user designed images) to a two dimensional pattern pieces that comprise the product as described below in more detail. As shown in FIG. 1B, the data generated by the user interface portion may include user account data, a product description (that describes the user's custom product), user image designs (that contains the user content), color choice (the color(s) chosen by the user), material choice (the type of material for the custom product) and the finishing choice (the finishing selected by the user for the custom product). The user interface portion assembles a set of instruction that describe the user design and requests images of the final product from the user product renderer portion 109b. The resulting interaction is performed in real time, in that the edit, request, design cycle may be performed in 250 milliseconds.

The product customization system then renders the customized product for the user/consumer (124) using the user product renderer portion 109b. The user product renderer portion takes the data/information/description of the two dimensional pattern pieces (based on the user interactions with the user interface portion) and other user preferences and using information supplied by the reflection portion 109e, synthesizes an image of the final cut and sewn manufactured product that is then displayed to the user/consumer. As shown in FIG. 1B, the reflection portion 109e (which provides feedback throughout the product customization unit) generates calibrated color maps and calibrated luminance maps to the calibrated product render assets (including geometry, luminance maps, color maps and safe area coverage maps) that are used to generate the images for the product. The product customization system then renders the customized product for the manufacturer (126) using the manufacturing product renderer portion 109c. The manufacturing product renderer portion receives the data/information/description of the two dimensional pattern pieces, other user preferences and information supplied by the reflection portion 109e and prepares Image Pattern Files, Cutting Files, and Operator directions used by the manufacturing portion 109d.

The product customization system then manufactures the customized product (128) using the manufacturing portion 109d. The manufacturing portion performs, for example, the following processes: 1) manufactures the flat pattern pieces using the Image Pattern Files and Cutting Files; 2) sews the pattern pieces based on the Operator directions; 3) performs finishing steps; 4) ships the product based on the Operator directions; and/or 5) gathers product information for the Reflection portion (including patterns, reference product with calibration mark-up and/or color and material samples) that are input to a modelshot processing component that performs various modelshot processing tasks as described in more detail in U.S. patent application Ser. No. 11/925,716 filed on Oct. 26, 2007 entitled "Product Modeling System and Method" which is incorporated herein by reference. An example of a mesh detection method that may be used in the modelshot processing is attached as Appendix A which is incorporated herein and forms part of the specification.

The product customization system then performs the reflection process (129) using the reflection portion 109e which is a portion of the system that provides feedback to the other portions of the systems. For example, the reflection portion may performs the following tasks: 1) provides updated product patterns to the manufacturing product renderer portion (the calibrated patterns and visible area layouts as shown in FIG. 1B); 2) manufactures reference product used by the user product renderer portion (the calibrated patterns and visible area layouts as shown in FIG. 1B); 3)

calibrates pattern position with the manufactures reference product; 4) provides calibrated photographic references of reference product to the user product renderer portion; and/or 5) provides calibrated reflectance and color mapping for the user product renderer portion (the calibrated color maps and calibrated luminance maps as shown in FIG. 1B).

User Product Renderer Portion Asset/Data Flow

The flow of assets/data in the user product renderer portion are now described in more detail. In particular, the manufacture portion 109d as shown in FIG. 1B may manufacture a reference product with printed marker pattern, and color-marked pattern regions using the same pattern and manufacturing techniques that will be used for the finished product which are forwarded to the reflectance portion 109e.

The reflectance portion performs a recording process, a detection process, a retouch process and a build runtime assets process to generate data and information that is forwarded onto the user product renderer. During the recording process, the reference product is photographed, or recorded in a predetermined set of views and environments as described more fully in U.S. patent application Ser. No. 11/925,716 filed on Oct. 26, 2007 entitled "Product Modeling System and Method" which is incorporated herein by reference. Once the recording process is completed, the detection process (also described in more detail on U.S. patent application Ser. No. 11/925,716 filed on Oct. 26, 2007 entitled "Product Modeling System and Method") occurs in which the following processes are performed: 1) detection of the pattern regions by color differences of the reference product; 2) detection of the marker pattern by frequency (bandpass) and color differences (see code in Appendix A); 3) mapping the detected marker pattern to the printed marker pattern using polygon adjacency (see code in Appendix A); 4) remove markers with Image Synthesis; and 5) remove Color differences using calibrated color data; 6) produce a set of artist-editable images for retouch wherein the images contain: a) a mesh for each pattern area which maps from the image space to the cut pattern space; b) a channel of visibility for each pattern; and c) a channel of visibility for each additional color or texture area.

During the re-touch process, the images generated by the detection process are reviewed and re-touched with respect to mesh alignment and the visibility channels. The reflection portion then generates the build runtime data that includes geometry and image data. It also creates a geometry for color regions, if needed, for Color and Material regions and subdivides each pattern grid into polygons, and culls each polygon by visibility in final image and output a Geometry File. The image data may convert the RGB data into luminance data; normalize visibility data for each pixel (which removes the need to clip data at runtime), pre-multiply luminance and visibility data (which replaces an Alpha Composite with an Add at runtime) and output all combined Luminance-Visibility channels as a compressed Luminance Map.

The user product renderer loads the product description and renders the image. During the loading of the product description, the user product renderer loads user images, selected tiled images for fills, color selections, material selections, geometry for style, size, view and/or luminance maps. When rendering the product image, the user product renderer renders a Black region for product area and, for each region in the Geometry file either: 1) if it is a pattern, sample the texture image and add the sample to the output image; or 2) if it is a color or material region, look up the color value from calibrated color reflectance map and add the value to the output image.

Manufacturing Product Rendering Asset/Data Flow

The flow of assets/data in the manufacturing product renderer portion are now described in more detail. The manufacturing product renderer portion may perform product design, manufacturing and receive feedback from the reflectance portion. During an initial product design, the manufacturing product renderer portion designs a print, cut and sew product which may include designing Cut Patterns, marking initial visible areas and noting grading rules for sizing. The manufacturing product renderer portion may also provide Print Files, Patterns, Sketches and Notes to Manufacturing Sample room, iterate on the product and repeat the repeat the design-Prototype process until design is complete.

For the manufacturing, the manufacturing product renderer portion may manufacture a Design Prototype (including a Prototype Printing Process, a Prototype Cut Process and a Prototype Sew Process) and provide a sample to Product Design. For product design, the manufacturing product renderer portion may grade samples (such as apply Grading Rules and produce a full Pattern Set and apply initial Visibility lines (provide full pattern set with visibility to Manufacturing and provide images for images for printing each pattern with a region color and marker grids). For manufacturing, the manufacturing product renderer portion may manufacture test reference set of product with region colors and markers.

The reflectance portion has an imaging portion (such as a camera) that photographs reference product, detect color regions and markers, refine visibility pattern regions (such as map visibility from photograph to pattern space, refine visibility regions, build tolerance data for print visibility (safe areas for print and maximum areas for print) and update patterns with visibility regions, builds layouts (including, for each pattern size, and style, building a layout template (with the maximum print and cut area for each pattern element for product, automatic positioning of pattern elements and review and correction of the pattern layout), and building pattern assets (such as cutting patterns, print regions, layout placements (product style and product size with cutlines, maximum print area and pattern annotations), and/or visibility regions (Border Patrol) for UI Interface (with safe areas and max print area.

The reflectance portion may require that multiple photographs be taken of a single object, with one camera, and one view, but with a specific lighting sequence. For example, this lighting sequence may include a back lit, or silhouette lighting for an image of the object, a diffuse front fill light image of the object, and additional sequences of directional or key lights for images of the object. The silhouette image of the object may be used to separate the object from its background, the fill image may be used for better automatic recognition of mark-up printed or applied to the object, and the key lights may be used to supply texture and surface detail present on the object.

The manufacturing product rendering portion can then pull the user product description from persistent storage, pull the pattern set for the particular product style and size, create the layout (including placing cutlines, placing print areas (mask by Max Print Area) (with user selected background colors, user images and user selected tiled image elements), place pattern annotations, provide data to manufacturing (the custom pattern layout and operator instructions with visual product reference) and the manufacture the product by printing the custom layout from provided data and cutting the custom layout from provided data. Now, the user interface portion of the product customization unit will be described in more detail.

Figure 2A:
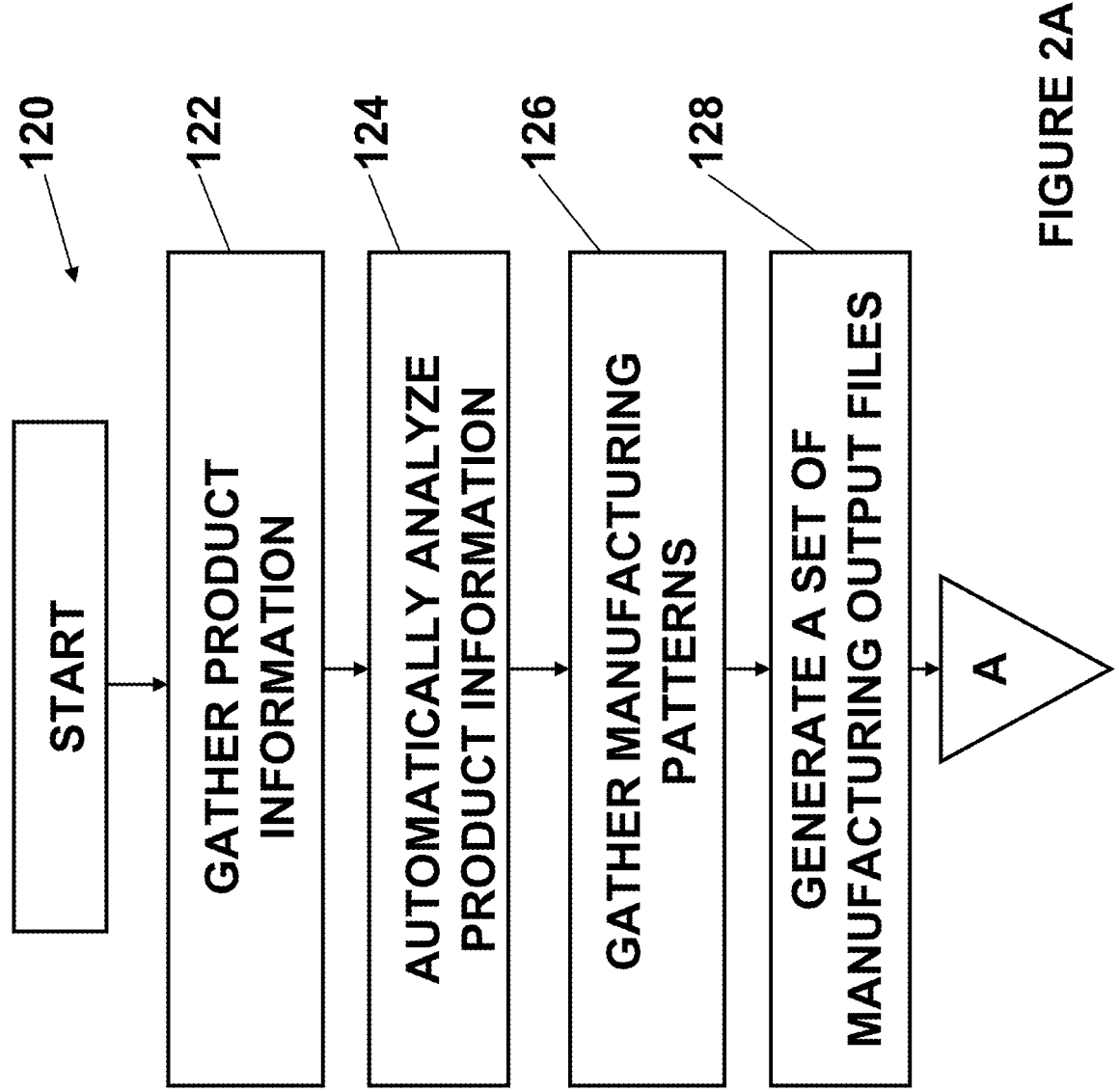
Figure 2C:
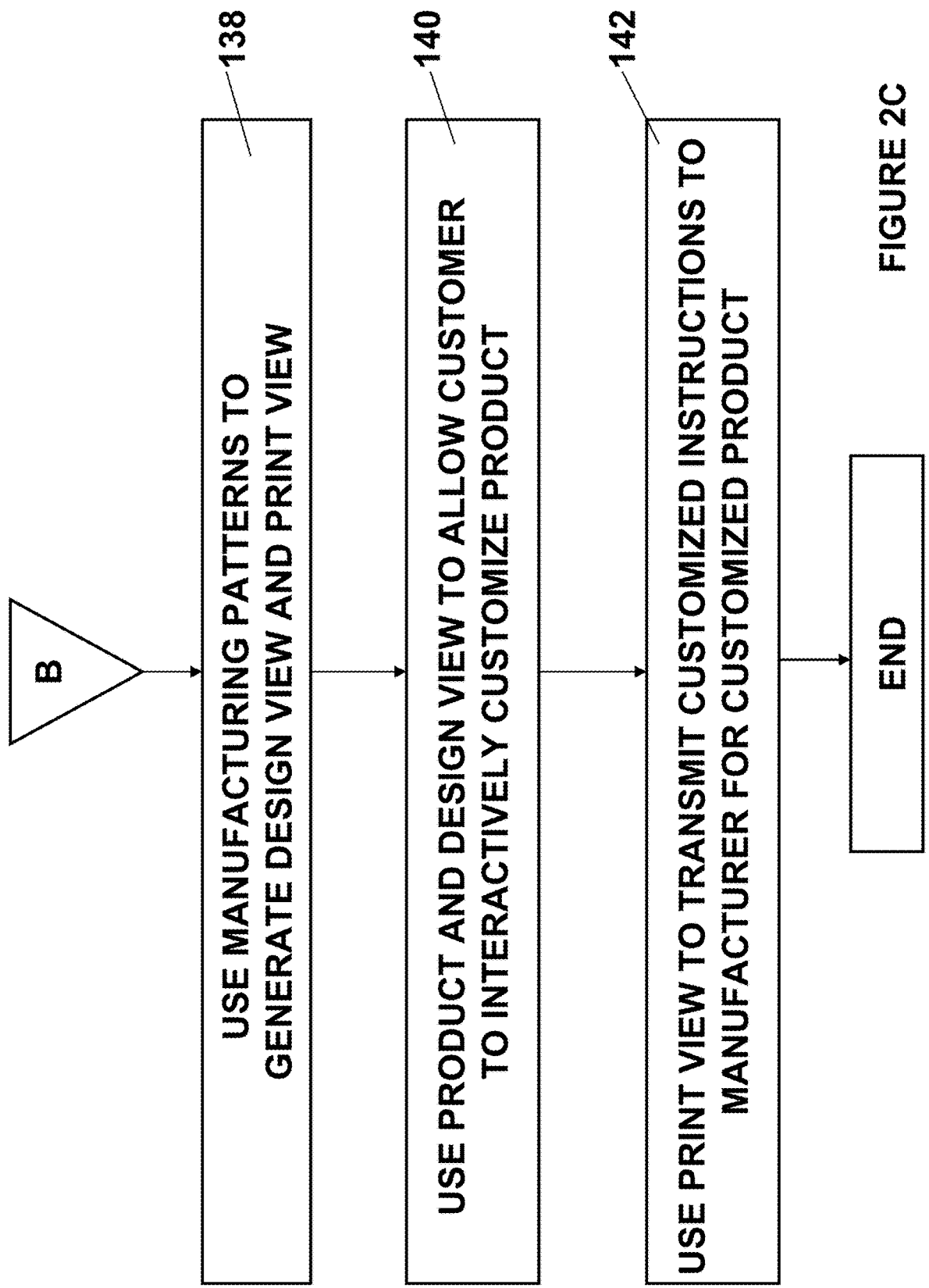
Figure 3A:
FIGS. 3A-3F illustrate a simple customized product generated using the process in FIGS. 2A-2C.
Figure 3B:
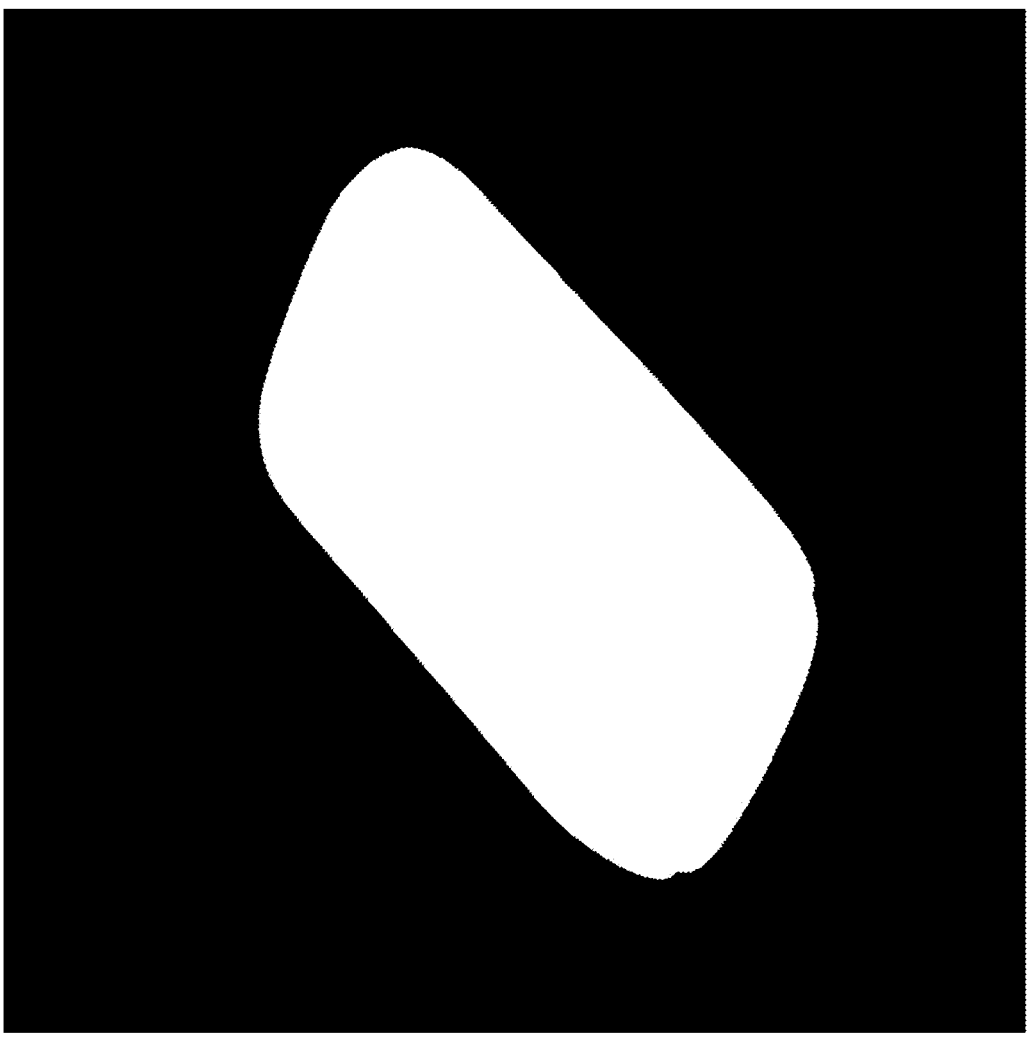
Figure 3C:
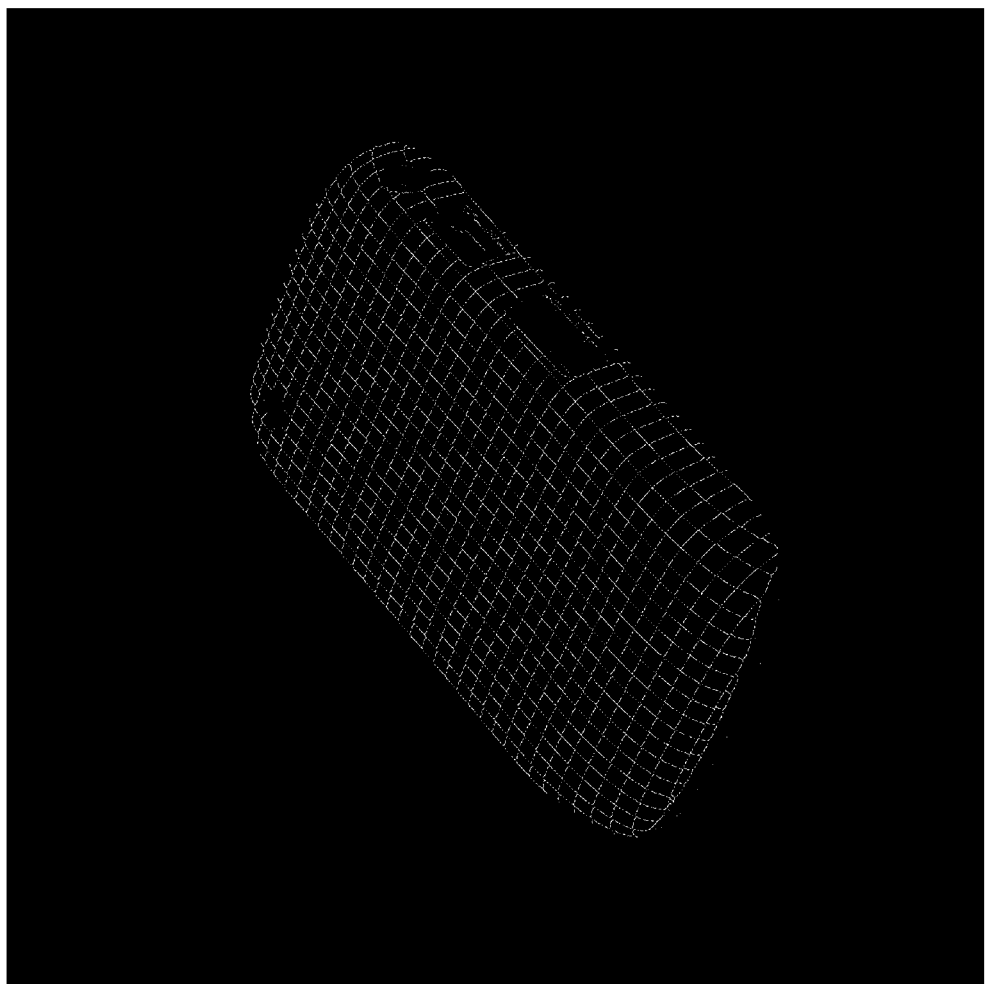
Figure 3D:
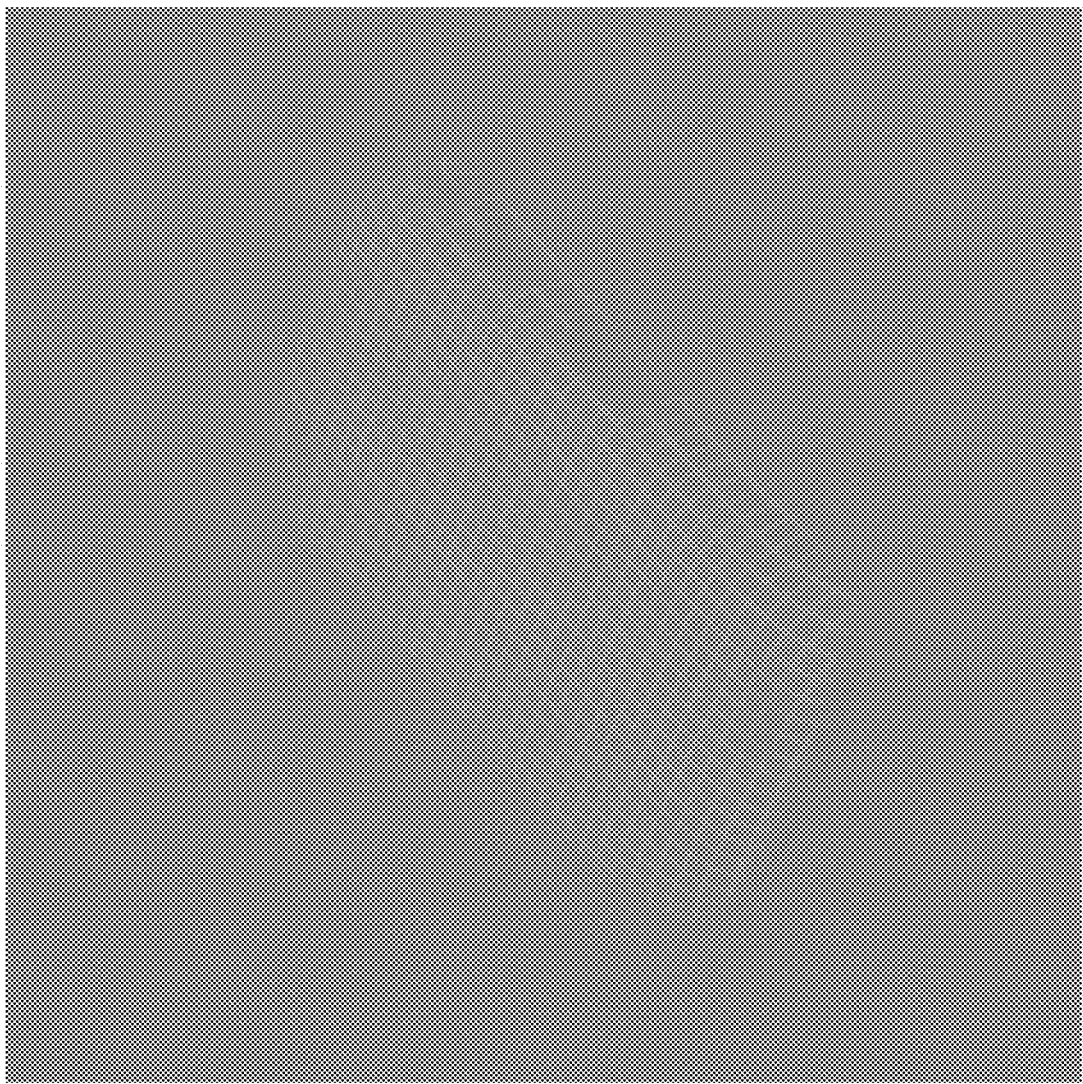
Figure 3E:
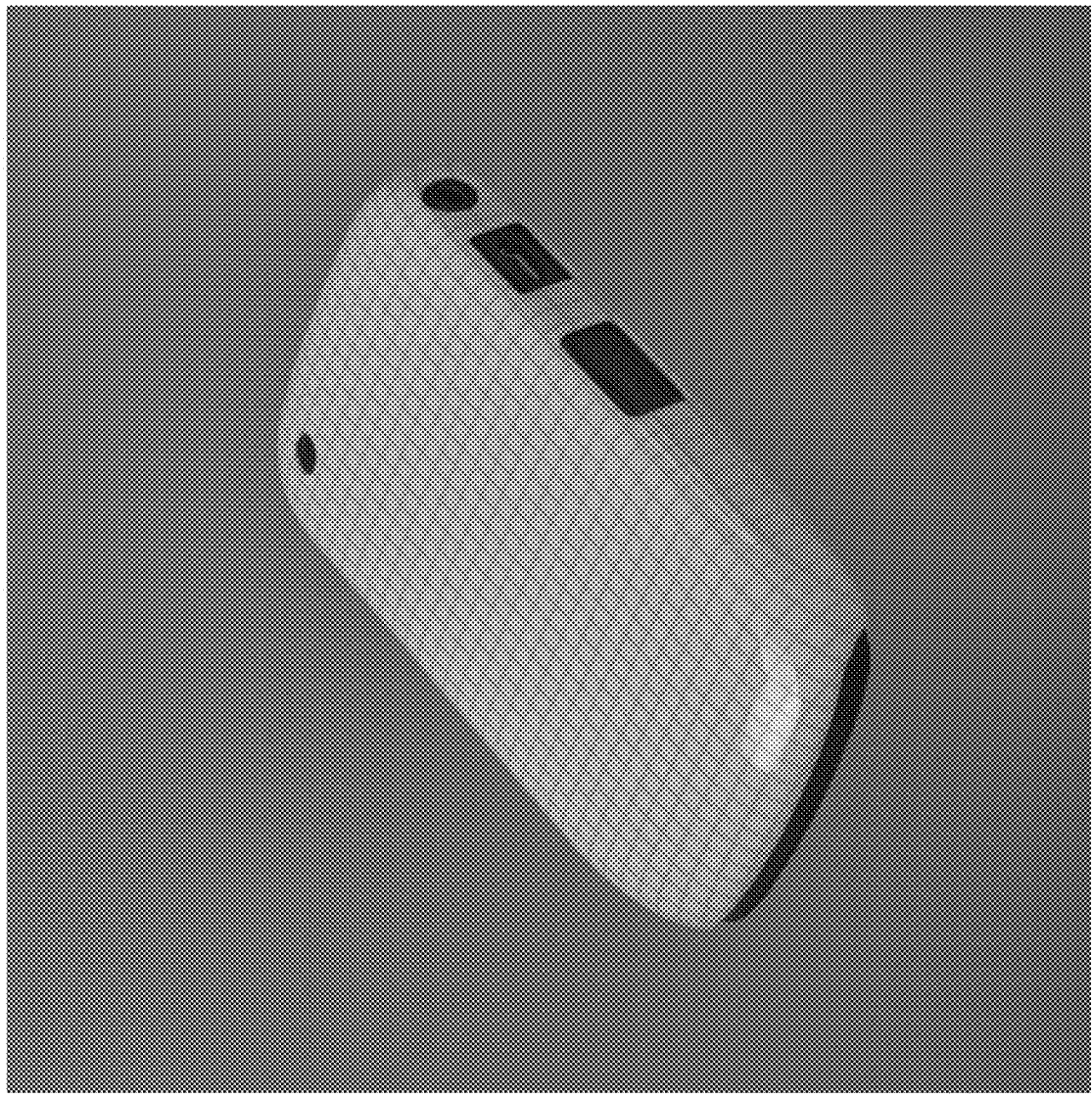
Figure 3F:

FIGS. 2A-2C illustrate a process 120 for acquisition, characterization, and application of Manufacturing patterns to the automated production of the digital representation of these patterns as interactive media that gathers a customer's input, and subsequent production of physical products. The method 120 may be carried out by the computer systems/units shown in FIG. 1A above. In one implementation, the method may be carried out by a plurality of lines of computer code that are executed by the processors of the computer systems/units shown in FIG. 1A above. In the method, the system gathers product shape, component and design information from a manufacturer (122) using an online tool and the product information may be called a Product Description. The system may then automatically analyze (124) the Product Description and select a method to process the Manufacturing Patterns, this may be called the Intake Flow. The system next may gather Manufacturing Patterns (126) from the Manufacturer using an online tool running the Intake Flow. The system may then generate a set of manufacturing output files (128) with specific Mark-up to characterize each Manufacturing Pattern, these are called Design Area Markups (which are described in more detail in co-pending U.S. patent application Ser. No. 11/925,716 filed on Oct. 26, 2007 and entitled "Product Modeling System and Method" and Ser. No. 12/546,582 filed on Aug. 24, 2009 and entitled "Product Customization System and Method" and Ser. No. 12/511,910 filed on Jul. 29, 2009 entitled "Product Customization System and Method", the entirety of all of which are incorporated herein by reference.)

The system may then automatically transmits Design Area Markups (130) and assembly instructions to the Manufacturer for the manufacturing of custom product with markup, this product may be called Reference Product. The system may then receive the Physical Reference Product (132) and use the photographic and computational methods described in the Intake Flow to map each Design area to the physical product. (described in more detail in co-pending U.S. patent application Ser. No. 11/925,716 filed on Oct. 26, 2007 and entitled "Product Modeling System and Method" and Ser. No. 12/546,582 filed on Aug. 24, 2009 and entitled "Product Customization System and Method" and Ser. No. 12/511,910 filed on Jul. 29, 2009 entitled "Product Customization System and Method", the entirety of all of which are incorporated herein by reference.)

The system then performs a reflection process 134 in which the system uses the mapping from the Intake Flow to validate the manufacturer's Product Description, set tolerances for physical position, orientation, color and application of the customized elements. The reflection process uses the manufacturing of Reference Product to adjust, calibrate, and accept (or reject) a candidate product. The system may then use photographic and computational methods (136) described in the intake flow to digitally remove the markup (which is described in more detail in co-pending U.S. patent application Ser. No. 11/925,716 filed on Oct. 26, 2007 and entitled "Product Modeling System and Method" and Ser. No. 12/546,582 filed on Aug. 24, 2009 and entitled "Product Customization System and Method" and Ser. No. 12/511,910 filed on Jul. 29, 2009 entitled "Product Customization System and Method", the entirety of all of which are incorporated herein by reference) from photographic images and automatically generate interactive assets that render a representation of the customizable product. This set interactive assets may be called the Product Views, or view.

The system may then use Manufacturing Patterns (138) to produce other interactive assets for the product, such as a DesignView and a PrintView. The DesignView is a view of each Design Area with an indication of what areas may be visible when product is made, areas which will be visible when the product is made, and the full extent of the Design Area. The Print View places a customer's custom design into the Manufacturer's pattern for manufacturing, including filtering scaling, orientation, and registration. The system then uses the Product View and the Design View to allow a Customer to interactively customize a product (140), the details of which are described in the co-pending patent application incorporated by reference above. The system then uses The Print View (142) to transmit the customization instructions to the Manufacturer.

The pattern for a design area may contain: the shape and measurement of the Design Area, the process used for customization, the visible area for customization, the cut area (if needed), the bleed area and the mask area. The layout may include: a symbol for the positioning of one or more design areas; markings indicate the use of symbols (the Design Area to product instance mapping), registration Marks or other marking needed for manufacturing or quality control and a client, Job, and or individual Product tracking markings The configuration may include a List of Configurable Properties.

Simple Products Method

Now the process for a simple product, such as a Blackberry case, is described in more detail with reference in FIGS. 3A-3F.

1. Products, or product components with a Single DesignArea that is largely visible from a single point of view.
   a. Gather the Design Area Pattern as a 2d vector asset.
   b. Gather the Layout as a 2d vector asset.
   c. Gather addition product configuration data (color, material choice).
   d. Build a Print View from the Layout and the Pattern.
   e. Generate a simple Mark-up output using the Print View.
      i. The placement of the Markup may be determined by the number of sub-elements, or the recognition of a known visible corner based on view.
   f. Transmit the Markup to the Manufacturer as a Reference Product request, setting the shipping address for the sample as the location of processing for Simple Products, and with tagging associating the reference product with the manufacturer's data.
   g. Receive the Reference Product at the Processing Location for Simple Products, and automatically process it using a camera and software system that performs the following automated tasks.
      i. For each view specified for interaction
         1. Automatically position the product or camera system to the specified view. (A camera and light array may be used)
         2. Record a Photographic Image that describes the markup.
         3. Record a Photographic Image that describes the product surface and lighting.
         4. Record a Photographic Image that describes the specular reflections from the product surface.
         5. Record an image that describes the product silhouette.
         6. Process the markup image to recognize the mapping of the design area to the product surface for that specified view.
         7. Adjust the found Design Area using the view position and orientation.

8. Process the product surface image to remove the markup.
9. Mask the non-design areas of the product using the found design area and the silhouette.
10. Find additional configurable regions using color as specified by the manufacturer.
11. Build an interactive Asset with the following structure . . .
    a. Background or fill shading.
    b. Luminance rendering of the product.
    c. Non design areas of the product.
    d. Additional product textures.
    e. Colorized regions for customization.
    f. DesignArea Mapping for applying customization.
    g. Overlay for Specular Lighting
12. Build interactive components for the asset
ii. For each specified transition from one specified view to another.
   1. For each desired transition increment
      a. Perform the same steps as listed above at a lower resolution
      b. Store collected images using multi-frame encoding.
      c. Store geometry changes as positions with motion path.
iii. Build Design Views.
iv. Automatically Package Assets and add to the interactive service.

Geometric Products Method
1. Products or product components with a Single DesignArea mapped to a given topology
   a. Geometry
      i. A Plane
      ii. A Conic Section
      iii. A Rectangular Solid
      iv. A Frame or sweep of a found cross section along a rectangular path.
      v. A Spherical Section.
      vi. A 3d CAD model with a mapping from design area coordinates to 3d surface coordinates.
   b. Gather the Design Area Pattern as a 2d vector asset.
   c. Gather the Layout as a 2d vector asset.
   d. Gather addition product configuration data (color, material choice).
   e. Gather geometry data characterizing the topology.
   f. Build a Print View from the Layout and the Pattern.
   g. Generate a Markup tiled with n×n sub markup output using the Print View.
      i. The number of markup tiles are determined by the topology
         1. 1×1 for a plane
         2. 4×1 for a Conic Section
         3. 1 sub markup for each customized side of a rectangular solid.
         4. 4×4 for a frame.
         5. 1 sub markup for each design area mapping in a CAD file.
      ii. Submarkup is characterized by color, pattern, or detectable change. (need to reference existing patent here).
   h. Transmit the Markup to the Manufacturer as a Reference Product request, setting the shipping address for the sample as the location of processing for Geometric Products, and with tagging associating the reference product with the manufacturer's data.
   i. Receive the Reference Product at the Processing Location for Geometric Products, and automatically process it using a camera and software system designed for that type of geometry and DesignArea Mapping that performs the following automated tasks.
      i. For each view specified for interaction
         1. Automatically position the product or camera to the specified view.
         2. Record a Photographic Image that describes the markup.
         3. Record a Photographic Image that describes the product surface and lighting.
         4. Record a Photographic Image that describes the specular reflections from the product surface.
         5. Record an image that describes the product silhouette.
         6. Optionally record a cross section of the topology using well known methods.
         7. Find the partial sub Design Area Markups using the markup photograph.
         8. Store the recorded images.
         9. store the partial Sub Design Markups in candidate relationships using the geometric description of the product topology.
      ii. Using the geometric information
         1. Check for a direct mapping between the geometry description and the SubDesign Markups if they are very close, fit the Geometry Description of the Design Area to the Sub Design Markups, and use the updated Geometric description for the mapping of the Design Areas.
         2. If the geometry description does not fit, we need to update the description.
            a. Find preferred views for each Sub Design Markup by finding the view where the markup is flat to the view.
            b. Recognize each SubDesignMarkup by checking adjacency and count of markup features.
            c. Determine the shape and position of each Sub Markup in the world by ray tracing from views adjacent to its preferred view.
            d. Optionally determine the geometry information using the saved cross sections.
            e. Update the mapping of the geometry to the Design Area using the found Sub Geometry position and shape.
      iii. Create a single interactive asset using the updated geometric description as its geometry, and create images for product, luminance, color masks, and embellishment with the same mappings as the DesignAreas. Additional textural and material attributes may be added as well.
         1. Add rendering means to the asset with these actions . . .
            a. Render the embellishment map using a procedure that emulates the manufacturing process.
            b. Render the background or fill for the product
            c. Using the geometry, and the luminance map render the luminance for the product.
            d. Using the geometry, and the color masks, textures and material attributes, render configurable portions of the product.
            e. Using the geometry and the embellishment map, render the embellishment.

f. Using the lighting positions used in the camera and lighting system, and environment assets, render reflections or other environmental lighting.
iv. With each view, using saved Photographic Images, aggregate an interactive asset.
  1. Process the product surface image to remove the markup.
  2. Use the updated Geometry to Design Area mapping to aggregate the product surface image onto its preferred portion of the asset's luminance image.
  3. Use the same technique to aggregate the product portion of the image.
  4. Using the same mapping technique, use the edge of the markup pattern to generate masks for the embellishment image
  5. Using the same mapping technique, transfer any found color areas to color area masks.
v. For each interactive view
  1. Configure the service to use the view settings of the preferred camera for that view.
vi. For each specified transition from one specified view to another.
  1. Configure the Service to render the interactive asset for each transition step by interpolating the view matrix for the asset.
vii. Build Design Views.

Automatically Package Assets and add to the interactive service.

Complex Products Method

1. Products, or product components with Single or multiple Design Areas Mapped to a flexible or complex form.
  a. Gather the Design Area Pattern as a 2d vector asset.
  b. Gather the Layout as a 2d vector asset.
  c. Gather addition product configuration data (color, material choice).
  d. Gather Design Area Pattern adjacency.
    i. For each design pattern find what other patterns they may be adjacent with.
  e. Build a Print View from the Layout and the Patterns.
  f. Generate a Markup for each pattern Area that has a specific by color, pattern, or detectable change.
  g. Use the PrintView to output a Markup Asset.
  h. Transmit the Markup Asset to the Manufacturer as a Reference Product request, setting the shipping address for the sample as the location of processing for Complex Products, and with tagging associating the reference product with the manufacturer's data.
  i. Receive the Reference Product at the Processing Location for Complex Products, and automatically process it using a camera and software system designed for that size of complex product. The Camera and software system performs the following automated tasks.
    i. For each view specified sample view
      1. Automatically position the product or camera to the specified view.
        a. This may be done with arrays of cameras.
      2. Record a Photographic Image that describes the markup.
      3. Record a Photographic Image that describes the product surface and lighting.
      4. Record a Photographic Image that describes the specular reflections from the product surface.
      5. Record an image that describes the product silhouette.
      6. Optionally record a cross section of the topology using well known methods.
      7. Find all the Design Markups using the markup photograph, and map the local adjacencies.
      8. Store the recorded images.
      9. Store the found Design Markups and their local adjacencies.
    ii. Using the Design Markups and adjacencies information
      1. Grade each local DesignMarkup adjacency based on its flatness to a given view.
      2. Resolve ambiguity by checking adjacencies for a given DesignMarkup and checking the count or other attributes of the markup features.
      3. Build a graph of global adjacency for all DesignAreaMarkups.
      4. Identify the preferred View for each DesignAreaMarkup based on its flatness to the camera
      5. Determine a candidate shape and position in space for each DesignAreaMarkup using a ray trace from its preferred view and two adjacent view.
      6. Use the candidate DesignAreaMarkup shape to register and fit all visible matches for it in other views.
    iii. For each view, using saved Photographic Images and resolved DesignAreaMarkups.
      1. Process the product surface image to remove the markup.
      2. Mask the non-design areas of the product using the found design area and the silhouette.
      3. Find additional configurable regions using color as specified by the manufacturer.
      4. Build an interactive Asset with the following structure . . .
        a. Background or fill shading.
        b. Luminance rendering of the product.
        c. Non design areas of the product.
        d. Additional product textures.
        e. Colorized regions for customization.
        f. DesignArea Mapping for applying customization.
        g. Overlay for Specular Lighting
      5. Build interactive components for the asset
    iv. For each specified transition from one specified view to another.
      1. For each desired transition increment
        a. Perform the same steps as listed above at a lower resolution
        b. Store collected images using multi-frame encoding.
        c. Store geometry changes as positions with motion path.
    v. Alternatively, complex products with large enough markup coverage, and a valid set of Design Area Surfaces, may be compiled into a single interactive asset using the techniques found in the Geometric Product Flow.
    vi. Build Design Views.
    vii. Automatically Package Assets and add to the interactive service.

Compound Products Method

Figure 4:
FIG. 4 illustrates a compound product generated using the process in FIGS. 2A-2C.

FIG. 4 illustrates a compound product generated using the process in FIGS. 2A-2C.

1. Compound Products are composed of two or more of simple, geometric, or complex products.
2. If the relationship between the products is purely geometric and well known, and all, or all but one the products are processed using the Geometry Flow, The each product may be processed separately, the assets are automatically integrated using the well known geometric relationship.

3. If the relationship between the products is not well known, the entire product may be treated as one complex product and processed in this manner.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system for acquisition, characterization, and application of one or more manufacturing patterns to the automated production of the digital representation of these patterns for a product, comprising:
 a computer having a processor that has a manufacturing unit, the manufacturing unit that automatically transmits a set of design area markups to a manufacturer that returns a reference product with mark-ups to the manufacturing unit;
 wherein the manufacturing unit automatically generates, based on the one or more manufacturing patterns, one or more interactive assets for the product about the manufacturing of the product;
 wherein the manufacturing unit uses the one or more interactive assets to allow a user to interactively customize the product and displays an image of the customized product to a user;
 wherein the manufacturing unit transmits one of the one or more interactive assets to the manufacturer that produces the customized product.

2. The system of claim 1, wherein the one or more interactive assets is one of a design view that is a view of each design area with visible regions and a print view that is a view of the one or more patterns with a user design placed onto the one or more patterns.

3. The system of claim 2, wherein the manufacturing unit transmits the print view to the manufacturer to produce the customized product.

4. The system of claim 1, wherein the manufacturing unit gathers a set of product information based on an analysis of the product and generates the one or more manufacturing patterns and generates manufacturing output files.

5. A method for acquisition, characterization, and application of one or more manufacturing patterns to the automated production of the digital representation of these patterns for a product, the method comprising:
 automatically transmitting, using a computer having a processor that has a manufacturing unit, a set of design area markups to a manufacturer that returns a reference product with mark-ups to the manufacturing unit;
 generating, by the manufacturing unit, based on the one or more manufacturing patterns, one or more interactive assets for the product about the manufacturing of the product;
 using, by the manufacturing unit, the one or more interactive assets to allow a user to interactively customize the product;
 displaying an image of the user customized product to the user; and
 transmitting, by the manufacturing unit, one of the one or more interactive assets to the manufacturer that produces the customized product.

6. The method of claim 5, wherein the one or more interactive assets is one of a design view that is a view of each design area with visible regions and a print view that is a view of the one or more patterns with a user design placed onto the one or more patterns.

7. The method of claim 6 further comprising transmitting, by the manufacturing unit, the print view to the manufacturer to produce the customized product.

8. The method of claim 5 further comprising gathering, by the manufacturing unit, a set of product information based on an analysis of the product and generates the one or more manufacturing patterns and generates manufacturing output files.

* * * * *